United States Patent [19]
Rozman et al.

[11] Patent Number: 4,875,149
[45] Date of Patent: Oct. 17, 1989

[54] PHASE SEPARATION CONTROL

[75] Inventors: Christopher J. Rozman, Delavan, Wis.; Derrick I. Roe; Bradley J. Recker, both of Rockford, Ill.

[73] Assignee: Sundstrand Corporation, Rockville, Ill.

[21] Appl. No.: 285,118

[22] Filed: Dec. 16, 1988

[51] Int. Cl.$^4$ .............................................. H02M 1/12
[52] U.S. Cl. ....................................... 363/41; 363/98; 363/132; 363/160
[58] Field of Search ....................... 363/37, 41, 56, 98, 363/131, 132, 159–161, 163

[56] References Cited

U.S. PATENT DOCUMENTS

| | | | |
|---|---|---|---|
| 4,156,275 | 5/1979 | Loberg | 363/41 |
| 4,218,732 | 8/1980 | Lafuze | 363/160 |
| 4,546,422 | 10/1985 | Okado | 363/98 |

Primary Examiner—Peter S. Wong
Attorney, Agent, or Firm—Marshall, O'Toole, Gerstein, Murray & Bicknell

[57] ABSTRACT

Polyphase inverters for converting AC power into polyphase AC output power typically experience phase shifts due to unbalanced phase loading. The resulting phase error is undesirable and should be eliminated, if possible. In order to overcome the foregoing problem, a control for maintaining N-1 phase outputs at desired angular displacements relative to a reference phase output determines the angular deviation of each of the N-1 phase outputs from the desired angular displacement for such phase output and adjusts a control waveform in time for each of a number of switches based upon the angular deviation of the phase output produced by such switch so that the angular deviations are minimized.

11 Claims, 3 Drawing Sheets

PHASE SEPARATION CONTROL

TECHNICAL FIELD

The present invention relates generally to waveform generators, and more particularly to a control for maintaining the output phases of a polyphase inverter at desired phase displacements.

BACKGROUND ART

Power inverters for converting DC power into AC power are typically of the polyphase type wherein a plurality of N AC phase outputs are produced. During operation of the inverter, an unbalanced load condition can arise wherein the loads on the phases are unequal. Typically, a polyphase filter is coupled to the inverter output which introduces phase shifts as a function of load. For such an inverter and filter, an unbalanced load condition can cause unequal phase shifts among the phases, resulting in phase errors.

The above described phase shifts are undesirable inasmuch as most polyphase loads require polyphase power at precise angular displacements.

The phase shifts are even more objectionable where the inverter is a part of a variable speed, constant frequency (VSCF) generating system which is connected in parallel with another VSCF system to one or more loads. In this case, the displacement between corresponding parallel connected phases of the VSCF systems determines the real load power share therebetween. If the displacements of the output phases of both systems are not controlled precisely, a highly undesirable load share condition may arise, in turn resulting in damage or destruction of one or more components.

Lafuze U.S. Pat. No. 4,218,732 discloses a phase angle balancing circuit for a VSCF system. Signals representing the polyphase output from a power converter are summed to produce a zero-sequence voltage signal which is combined in a negative feedback fashion with the control signals for switches in the power converter. Correction of phase shifts in the converter output is accomplished by a phase correction loop which vectorially sums correction voltages with each phase output wherein each correction voltage is at an angular displacement different than the phase output with which it is summed so as to reduce the angular displacement error. Such correction varies the magnitude of the converter output from a desired level, which variance is minimized by a voltage regulation loop. This balancing circuit, therefore, results in interaction between the phase correction and voltage regulation loops, in turn leading to increased complexity.

SUMMARY OF THE INVENTION

In accordance with the present invention, a waveform generator develops phase outputs at precise angular displacements in a simple and effective fashion.

More particularly, a waveform generator which develops N-1 phase outputs at desired angular displacements relative to a reference phase output includes means for determining the angular deviation of each of the N-1 phase outputs from the desired angular displacement relative to the reference phase output and means responsive to the determining means for adjusting a control waveform for each of a number of switches in time based upon the angular deviation of the phase output produced by such switch so that the angular deviations are minimized.

In the preferred embodiment, the generator comprises a three-phase inverter and control coupled through an output filter and a feeder to a load wherein the phase voltages at a point of regulation (POR) should be displaced 120° from one another. In the preferred embodiment, phase detectors detect the displacement between the POR phase A and POR phase C output voltages and the displacement between the POR phase B and POR phase C output voltages. The displacements are summed with signals representing the desired 120° displacements to derive deviation signals representing the deviation of each POR phase voltage from the desired displacement. The resultant deviation signals comprise digital values which are summed by a digital summer with the output of a counter. The digital summers control the generation of control waveforms for the POR phase A and phase B voltages so that the phase displacements of these phase voltages are adjusted precisely relative to the phase C POR voltage.

In an alternative embodiment of the invention, signals representing one or more parameters of the power developed by each of phases A and B are summed with corresponding signals representing parameter(s) of the power developed by the reference phase C in order to derive power error signals which are used to address lookup tables. The lookup tables develop a digital value representing the expected phase error resulting from an imbalance in phase output powers. The resulting digital values are applied to the digital summers described previously to control the addressing of the memories.

In both embodiments, phase separation is precisely controlled so that the problems and disadvantages noted above are avoided.

DESCRIPTION OF THE PREFERRED EMBODIMENTS

Figure 1:
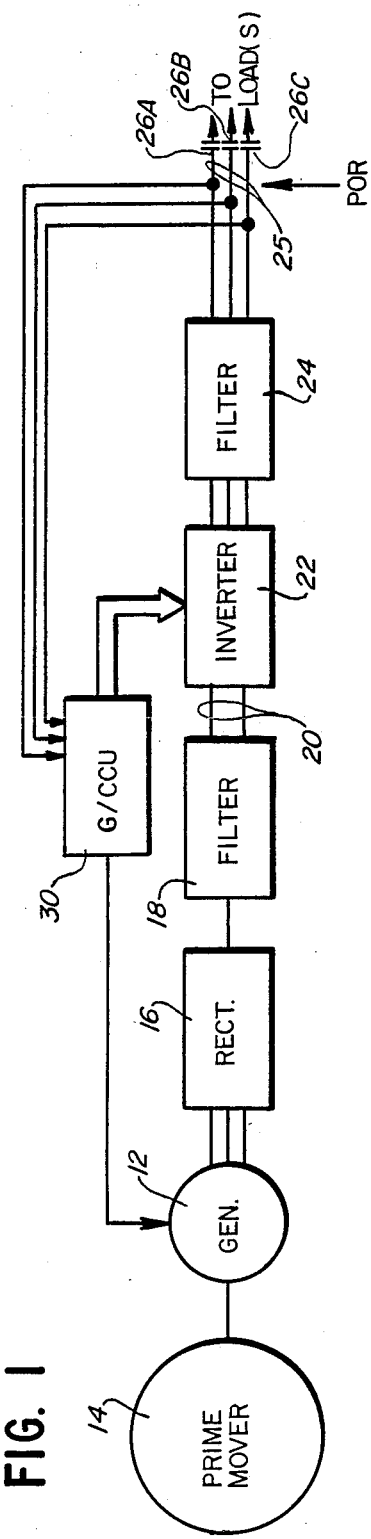
FIG. 1 is a block diagram of a variable speed constant frequency (VSCF) system incorporating an inverter and an inverter control according to the present invention.

Referring now to FIG. 1, a VSCF system 10 includes a brushless, synchronous generator 12 which is driven by a variable speed prime mover 14 which may be, for example, a jet engine. The generator 12 develops output power at a frequency which is variable in dependence upon the speed of the prime mover 14. The variable frequency power developed by the generator 12 is converted into DC power by a rectifier 16 and a filter 18 and is delivered over a DC link 20 to a polyphase inverter 22 which may be coupled to an optional output filter 24. The filter 24 is connected by a feeder 25 and contactors 26a–26c to one or more loads. The inverter 22 includes switches, shown in greater detail in FIG. 2, which are controlled by a generator/converter control unit (G/CCU) 30 which incorporates a phase separation control according to the present invention. The G/CCU also controls the excitation of the generator 12 in accordance with one or more parameters of the power developed at a point of regulation (POR) near the contactors 26a–26c.

Figure 2:
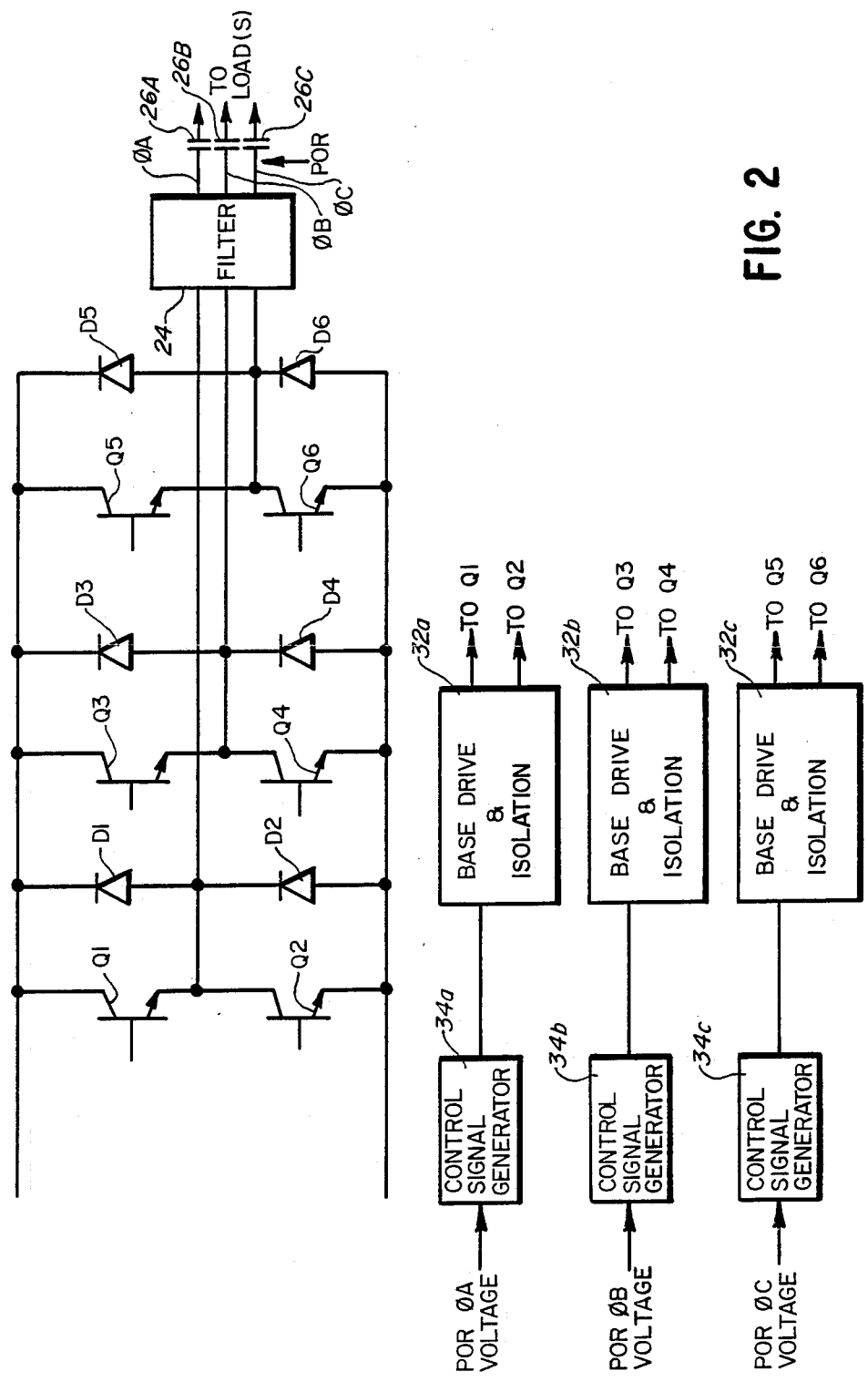
FIG. 2 is a combined block and simplified schematic diagram of the inverter and control illustrated in block diagram form in FIG. 1.

Referring now to FIG. 2, there is illustrated in greater detail a portion of the G/CCU 30 and a possible topology for the inverter 22. The inverter 22 includes six switches in the form of power transistors Q1–Q6 which are connected together in a conventional bridge configuration together with associated flyback diodes D1–D6. Each inverter output phase is produced by operation of a pair of switches, for example switches Q1 and Q2 for phase A. As an alternative to the inverter topology illustrated in FIG. 2, the inverter may be of the neutral point type wherein three power switches are operated to produce a phase output. Other types of inverters may alternatively be controlled by the control of the present invention, e.g. a neutral point clamped inverter having nine switches, as should be evident to one skilled in the art.

The G/CCU 30 includes base drive and isolation circuits 32a–32c which develop base drive signals for controlling the switches Q1–Q6. Each base drive and isolation circuit 32a–32c receives a control signal developed by an associated control signal generator 34a–34c, respectively.

Each control signal generator 34a–34c is responsive to one of the phase voltages developed at the POR.

Figure 3:
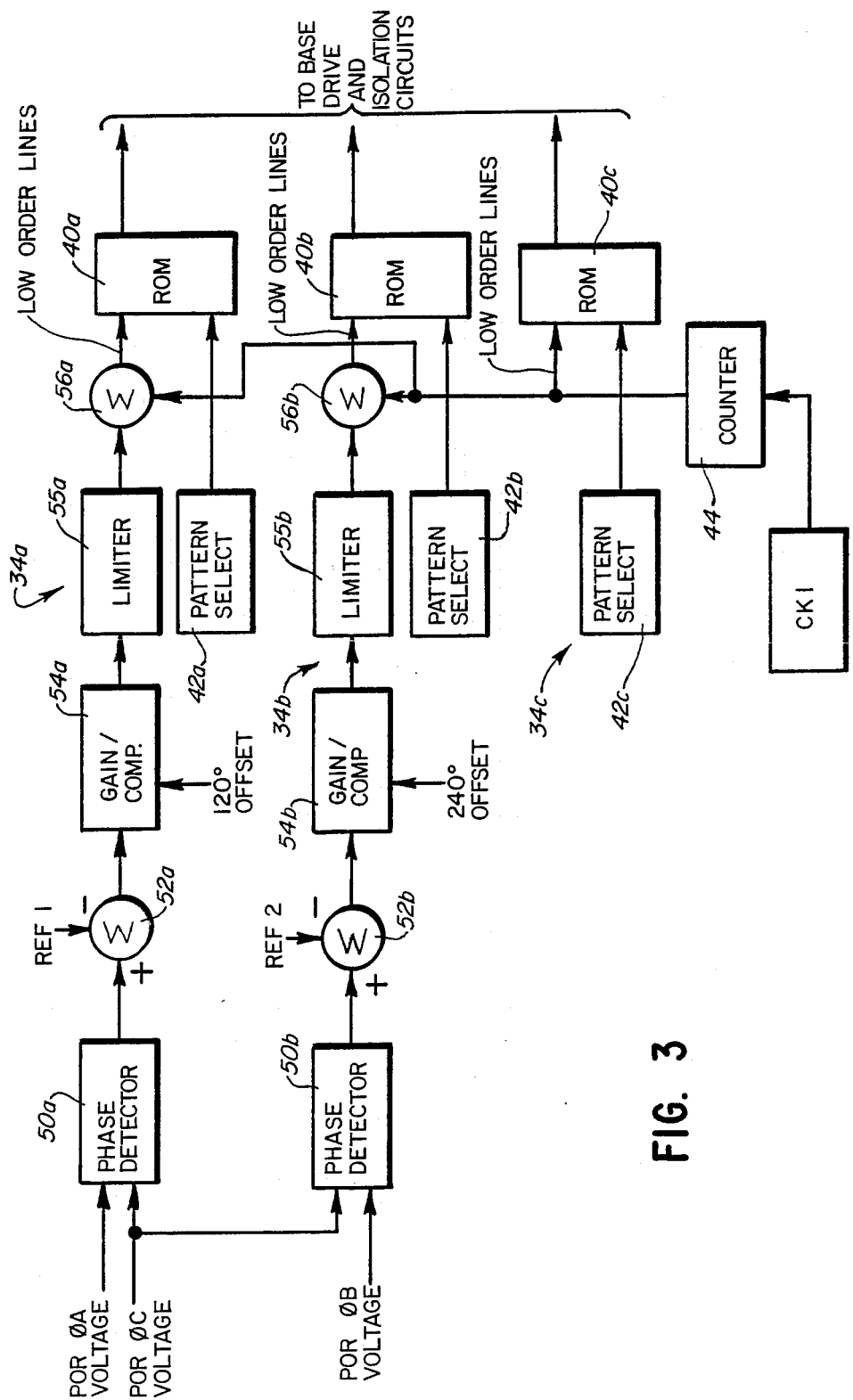
FIG. 3 is a block diagram of the control signal generators illustrated in FIG. 2 according to a first embodiment of the invention.

Referring now to FIG. 3, there is illustrated in greater detail the control signal generators 34a–34c. Each includes a memory 40a–40c which preferably stores a plurality of pulse width modulated (PWM) waveforms which are retrieved and provided as the control signals to the base drive and isolation circuits 32a–32c. Each memory 40a–40c may be of the read only memory (ROM) type or may be any other type, as desired. Each PWM waveform is obtained by sequentially addressing successive memory locations in the memory 40a–40c under control of addressing signals provided by a pattern selection circuit 42a–42c. The frequency at which the particular memory locations are addressed is controlled by a clock CK1. Low order address lines of the memory 40c (the memory for the reference phase) receive a digital value produced by a counter 44. Thus, the fundamental output frequency of the power produced at the phase C output is controlled by the output frequency of the counter 44. The output frequency of the remaining phases A and B are likewise controlled by the frequency of the counter 44, as noted in greater detail below.

The POR phase voltages are detected and applied to phase A and phase B phase detectors 50a, 50b which develop outputs representing the phase displacement between the POR phase A and phase C voltages and the POR phase B and phase C voltages. The signal from the phase detector 50a is summed with a reference signal REF1 by a summer 52a. The signal REF1 represents the desired phase displacement between phases A and C. Likewise, the signal from the phase detector 50b is summed by a summer 52b with a reference signal REF2 which represents the desired phase displacement between phases B and C. The resulting deviation signals from the summers 52a, 52b represent the deviation of the phase A and phase B voltages relative to their desired displacements with respect to the phase C voltage and are processed by optional gain and compensation units 54a, 54b and limiters 55a, 55b and applied to digital summers 56a, 56b, respectively.

The outputs of the limiters 55a, 55b and the output of the counter 44 are digital values which are applied to the digital summers 56a, 56b. It is by means of these summers 56a, 56b that the low order addresses of the memories 40a and 40b can be advanced or retarded with respect to the low order address lines of the memory 40c (i.e. the reference phase) to achieve phase separation control. The outputs of the summers 56a, 56b are such that the waveforms developed at the output of the memories 40a, 40b lead the waveform developed at the output of the memory 40c by 240° and 120°, respectively.

As the foregoing discussion demonstrates, the values provided by the gain and compensation blocks 54a, 54b are correction values which advance or retard the addressing of memory locations in the memories 40a, 40b, as necessary to maintain precise 120° phase displacement in the phase outputs.

Figure 4:
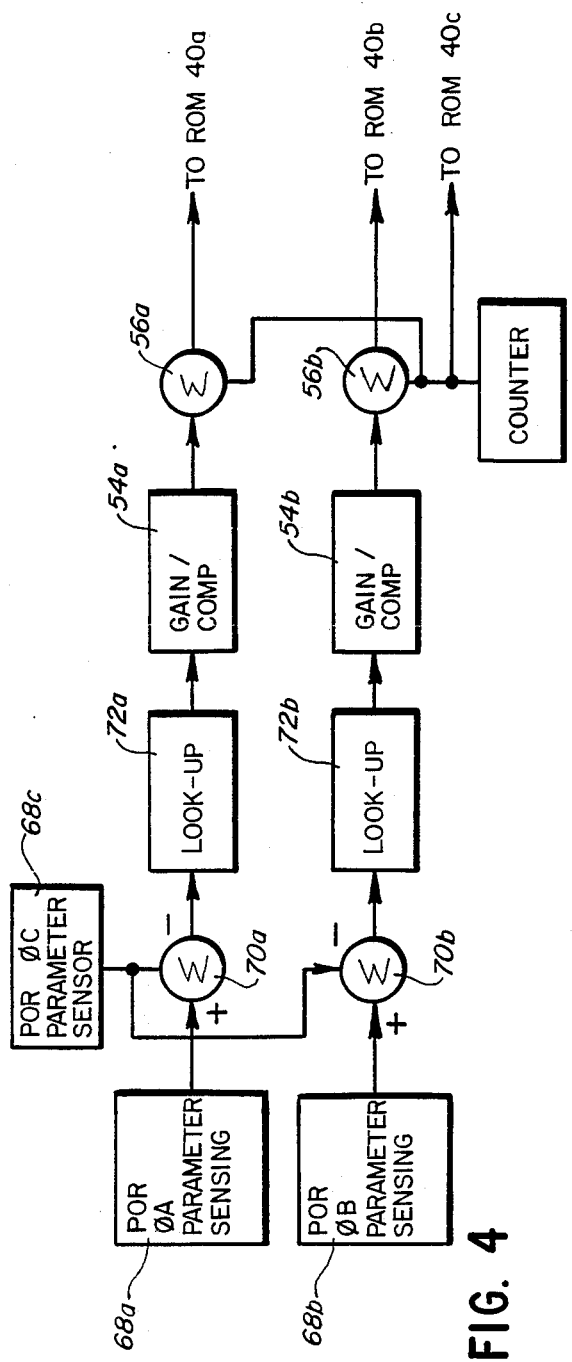
FIG. 4 is a block diagram illustrating modifications to the generators of FIG. 3 to implement an alternative embodiment of the present invention.

Referring now to FIG. 4 there is shown a modification of the control of FIG. 3 in order to implement an alternative embodiment of the present invention. The embodiment of FIG. 4 is an open loop control which relies upon prior knowledge of phase shifts as a function of load so that phase errors can be accurately corrected.

The phase detectors 50a, 50b and summers 52a, 52b of FIG. 3 are replaced by phase A, phase B and phase C sensors 68a–68c, summers 70a, 70b and lookup tables 72a, 72b. The sensors 68a–68c senses one or more parameters of the power at the POR, e.g. total power, real and/or reactive power, current, power factor, etc... The output of the phase C sensor is subtracted from the outputs of the phase A and phase B sensors by the summers 70a, 70b. The resulting signals represent the difference in the power parameter(s) provided to the POR by the phase A and phase C outputs and the difference in the power parameter(s) at the phase B and phase C outputs. These signals are provided to the lookup tables 72a, 72b which store a series of values representing the desired phase displacement between phases A and C and phases B and C for each of a plurality of phase parameter differences. The lookup table outputs are coupled to the optional gain and compensation units 54a, 54b and then to the digital summers 56a, 56b and the balance of the circuitry shown in FIG. 3.

As was noted in connection with the previous embodiment, the control of the alternative embodiment is capable of accurately controlling phase separation, provided that prior knowledge of phase shifts with load are accurately known in advance.

Either of the foregoing embodiments can be used in parallel generating systems, if desired.

The controls are also capable of maintaining nominal 120° phase separation in a three-phase inverter output so that phase sensitive loads are efficiently operated.

It should also be noted that the PWM waveforms may be generated by circuits or software other than the memories 40a–40c, for example, by PWM generators, if desired.

We claim:

1. A waveform generator which develops a certain number of phase outputs at desired angular displacements relative to a reference phase output wherein each phase output is produced by at least one switch controlled by a control waveform, comprising:

means for determining the angular deviation of each of the certain number of phase outputs from the desired angular displacement for such phase output; and means responsive to the determining means for adjusting the control waveform for each switch in time based upon the angular deviation of the phase output produced by such switch so that the angular deviations are minimized.

2. The waveform generator of claim 1, wherein the determining means comprises a certain number of phase detectors each of which develops a signal representing the phase displacement of a phase output voltage relative to a voltage developed at the reference phase output.

3. The waveform generator of claim 2 wherein the determining means further comprises a certain number of summers each coupled to the output of a phase detector and each of which develops a signal representing the angular deviation of one of the certain number of phase output voltages from the desired angular displacement of such output.

4. The waveform generator of claim 1, further including a clock, a counter coupled to the clock and a memory associated with each phase output wherein each memory develops a control waveform and includes address lines wherein the address lines of the memory associated with the reference phase output are coupled to the counter and wherein the adjusting means includes a digital summer having inputs coupled to the determining means and to the counter and an output coupled to the address lines of the memories associated with the certain number of phase outputs.

5. A control for maintaining a parameter of N-1 phase outputs of an inverter at desired angular displacements relative to a reference phase output of the inverter wherein each phase output is produced by at least one switch controlled by a control waveform and wherein N is an integer greater than 1, comprising:

means for determining the angular deviation of each of the N-1 phase output parameters from the desired angular displacement for such phase output; and means responsive to the determining means for adjusting the control waveform for each switch in time based upon the angular deviation of the phase output produced by such switch so that the angular deviations are minimized.

6. The control of claim 5, wherein the determining means comprises N-1 phase detectors each of which develops a signal representing the phase displacement of a phase output voltage relative to a voltage developed at the reference phase output.

7. The control of claim 6, wherein the determining means further comprises N-1 summers each coupled to the output of a phase detector and each of which develops a signal representing the angular deviation of one of the N-1 phase output voltages from the desired angular displacement to such phase output.

8. The control of claim 5, further including a clock, a counter coupled to the clock and a memory associated with each phase output wherein each memory develops a control waveform and includes address lines wherein the address lines of the memory associated with the reference phase output are coupled to the counter and wherein the adjusting means includes a digital summer having inputs coupled to the determining means and to the counter and an output coupled to the address lines of the memories associated with the N-1 phase outputs.

9. A control for maintaining a parameter of N-1 phase outputs of an inverter at desired angular displacements relative to a reference phase output of the inverter wherein each phase output is produced by at least one switch controlled by a control waveform and wherein N is an integer greater than one, comprising:

means for sensing a parameter of the power produced at each phase output;

means coupled to the sensing means for generating difference signals representing the difference in magnitude between the power parameter produced at each of the N-1 phase outputs and the power parameter produced at the reference phase output;

means responsive to the generating means for developing N-1 phase error signals from the difference signals; and means responsive to the developing means for adjusting the control waveform for each switch in time based upon the phase error signals so that the angular deviations are minimized.

10. The control of claim 9, wherein the generating means comprises summers which sum signals representing the power developed at each of the N-1 phase outputs with a signal representing the power developed at the reference phase output.

11. The control of claim 9, further including a clock, a counter coupled to the clock and a memory associated with each phase output wherein each memory develops a control waveform and includes address lines wherein the address lines of the memory associated with the reference phase output are coupled to the counter and wherein the adjusting means includes a digital summer having inputs coupled to the generating means and to the counter and an output coupled to the address lines of the memories associated with the N-1 phase outputs.

* * * * *